(12) United States Patent
Wisman

(10) Patent No.: US 9,083,160 B2
(45) Date of Patent: Jul. 14, 2015

(54) MULTI-FUNCTION HIGH VOLTAGE WIRE SERVICE HANDTOOL

(71) Applicant: Wisman Enterprises, LLC, Mason City, IA (US)

(72) Inventor: Theodore Wisman, Mason City, IA (US)

(73) Assignee: Wisman Enterprises, LLC, Mason City, IA (US)

( * ) Notice: Subject to any disclaimer, the term of this patent is extended or adjusted under 35 U.S.C. 154(b) by 285 days.

(21) Appl. No.: 13/706,119

(22) Filed: Dec. 5, 2012

(65) Prior Publication Data

US 2014/0083262 A1    Mar. 27, 2014

Related U.S. Application Data

(60) Provisional application No. 61/704,895, filed on Sep. 24, 2012.

(51) Int. Cl.
| | | |
|---|---|---|
| *H02G 1/02* | (2006.01) | |
| *B25B 27/14* | (2006.01) | |
| *H02G 7/12* | (2006.01) | |
| *H02G 1/00* | (2006.01) | |

(52) U.S. Cl.
CPC ........ *H02G 1/02* (2013.01); *B25B 27/14* (2013.01); *H02G 1/00* (2013.01); *H02G 7/12* (2013.01); *Y10T 29/49* (2015.01); *Y10T 29/49815* (2015.01)

(58) Field of Classification Search
CPC .......... B25B 27/00; B25B 27/14; H02G 1/00; H02G 1/02; H02G 1/04; H02G 1/14; H02G 7/00; H02G 7/05; H02G 7/12

USPC ............... 81/484, 3.7; 174/146; 254/104, 131
See application file for complete search history.

(56) References Cited

U.S. PATENT DOCUMENTS

| | | | |
|---|---|---|---|
| 186,835 A | 1/1877 | Hayden | |
| 350,515 A | 10/1886 | Williams | |
| 530,361 A | 12/1894 | Smith et al. | |
| 1,180,507 A | 4/1916 | Kortick | |
| 2,135,065 A | 11/1938 | Wick | |
| 2,447,093 A | 8/1948 | Schley | |
| 2,716,813 A | 9/1955 | Smyres | |
| 2,739,832 A | 3/1956 | Thorpe | |
| 2,804,887 A | 9/1957 | Reck | |
| 3,295,830 A * | 1/1967 | Bogese ..................... 254/131 |
| 3,352,301 A * | 11/1967 | Abelson ..................... 81/3.7 |
| 3,564,118 A | 2/1971 | Becker | |

(Continued)

*Primary Examiner* — Hadi Shakeri
(74) *Attorney, Agent, or Firm* — Schwegman Lundberg & Woessner, P.A.

(57) ABSTRACT

An example includes a hand tool for repairing high-voltage electric power transmission cable, the tool including a generally straight elongate bar extending from a proximal portion including a back end to a distal portion including a tip that is generally smaller in diameter than the proximal portion, the proximal portion including a hand-graspable handle, the bar defining a hollow extending into the handle, the hollow extending from an interior wall of the hollow to an opening in the handle, the bar including a shoulder encircling the bar defining a transition between an at least partially conical shape extending from the tip to the shoulder and a spreader portion extending from the shoulder to the handle, wherein the hollow is sized to receive the transmission cable, with the opening being larger in diameter than both the conductor of the transmission cable and an insulator of the transmission cable.

16 Claims, 12 Drawing Sheets

(56) References Cited

U.S. PATENT DOCUMENTS

| | | | |
|---|---|---|---|
| 3,734,462 A * | 5/1973 | Slade | 254/1 |
| 3,819,288 A | 6/1974 | Carmien | |
| 3,868,136 A | 2/1975 | Schweitzer, Jr. | |
| 3,980,409 A | 9/1976 | Turner | |
| 4,230,357 A | 10/1980 | Bosch et al. | |
| 4,242,930 A | 1/1981 | Myers et al. | |
| 4,277,197 A | 7/1981 | Bingham | |
| 4,378,065 A | 3/1983 | Smirne | |
| 4,776,089 A | 10/1988 | Schoenwetter et al. | |
| 5,642,591 A | 7/1997 | Eddie | |
| 5,915,770 A | 6/1999 | Bergstrom | |
| 5,918,337 A | 7/1999 | Evling et al. | |
| 5,975,465 A | 11/1999 | Donal et al. | |
| 6,364,031 B1 | 4/2002 | Amicangelo | |
| 8,833,213 B2 * | 9/2014 | Abel et al. | 81/485 |

\* cited by examiner

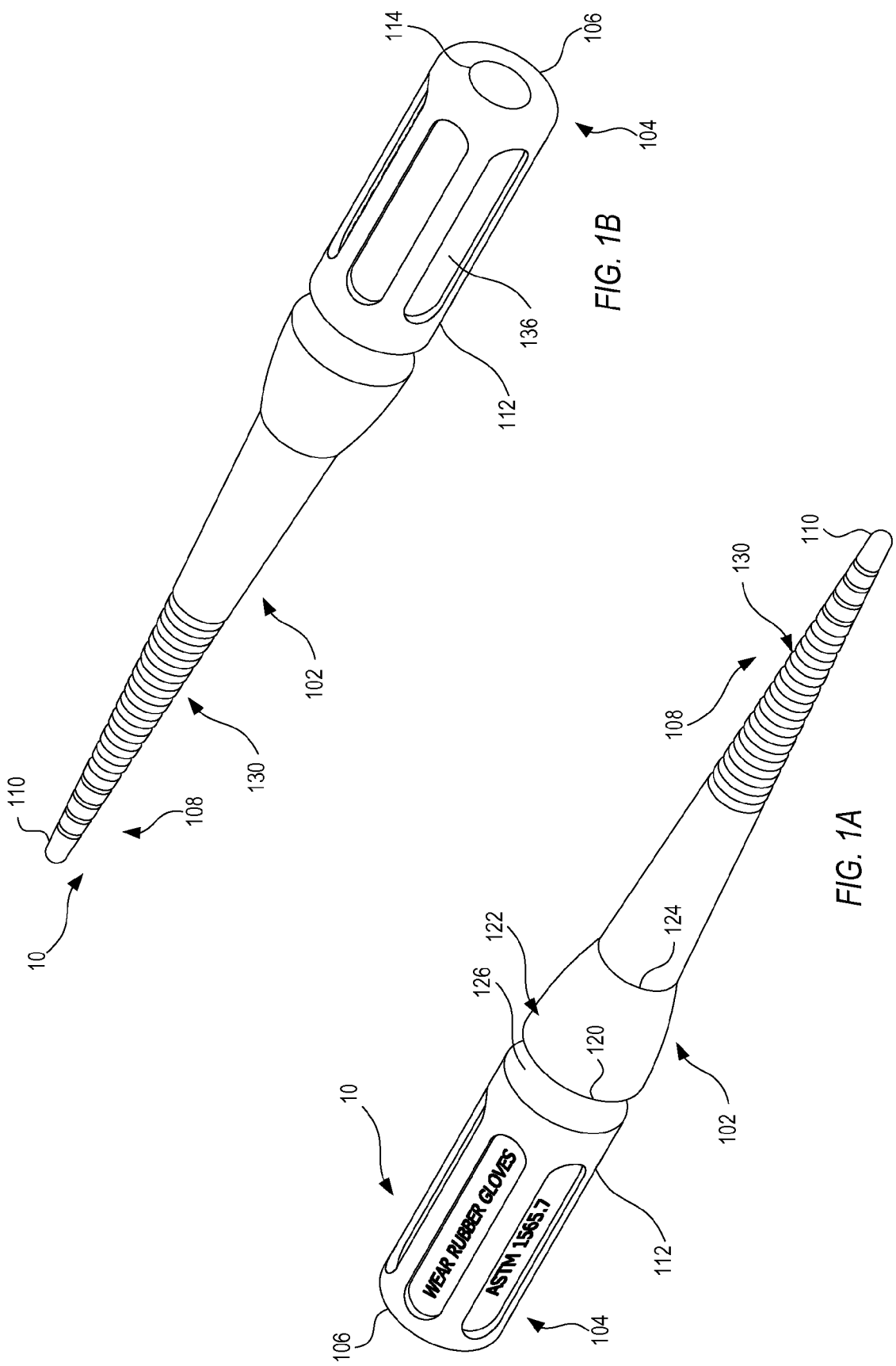

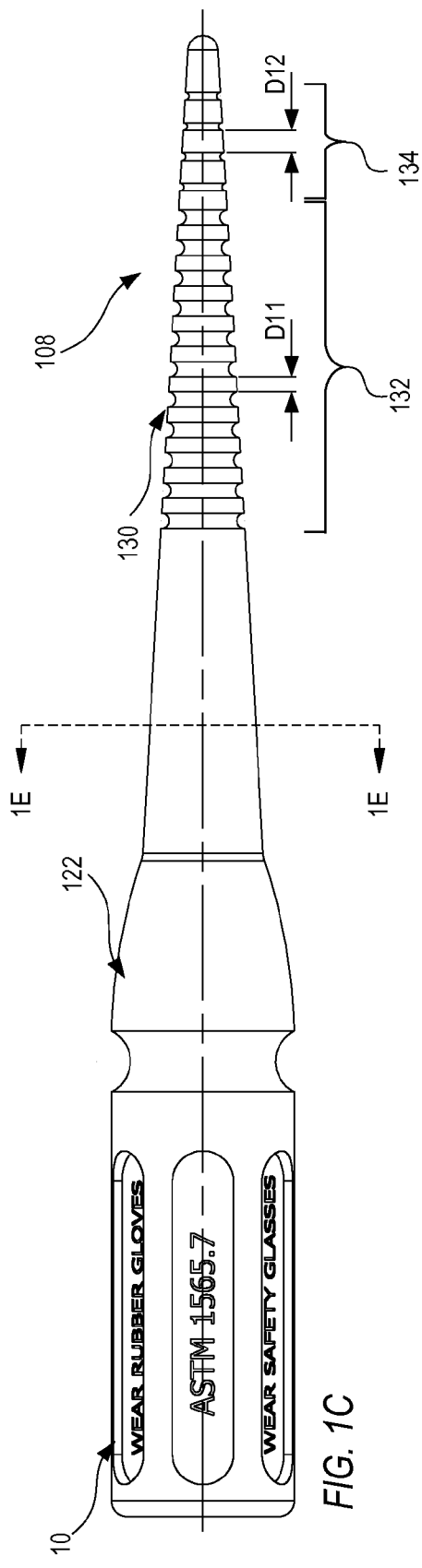
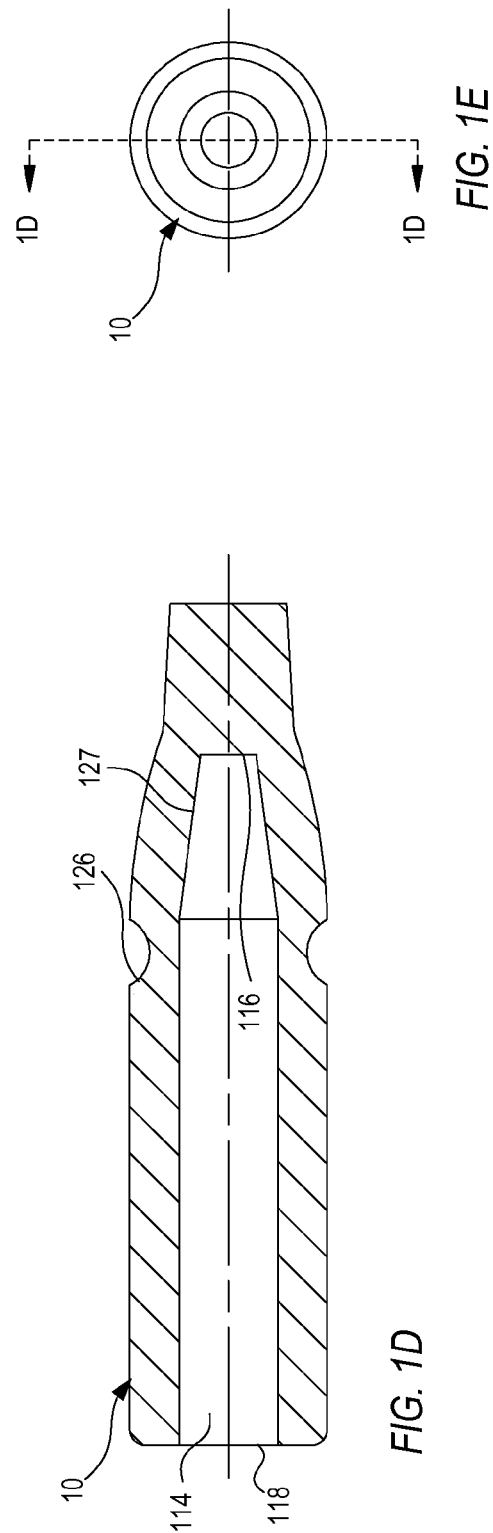
FIG. 1C
FIG. 1D
FIG. 1E

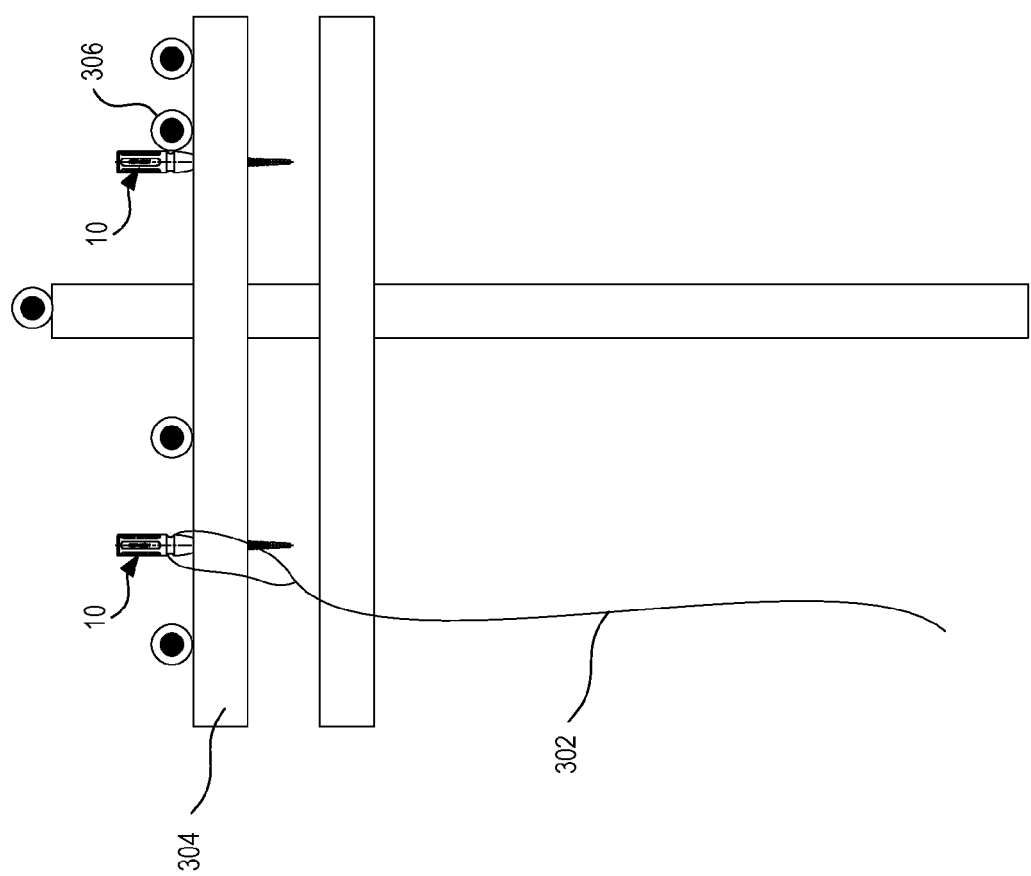

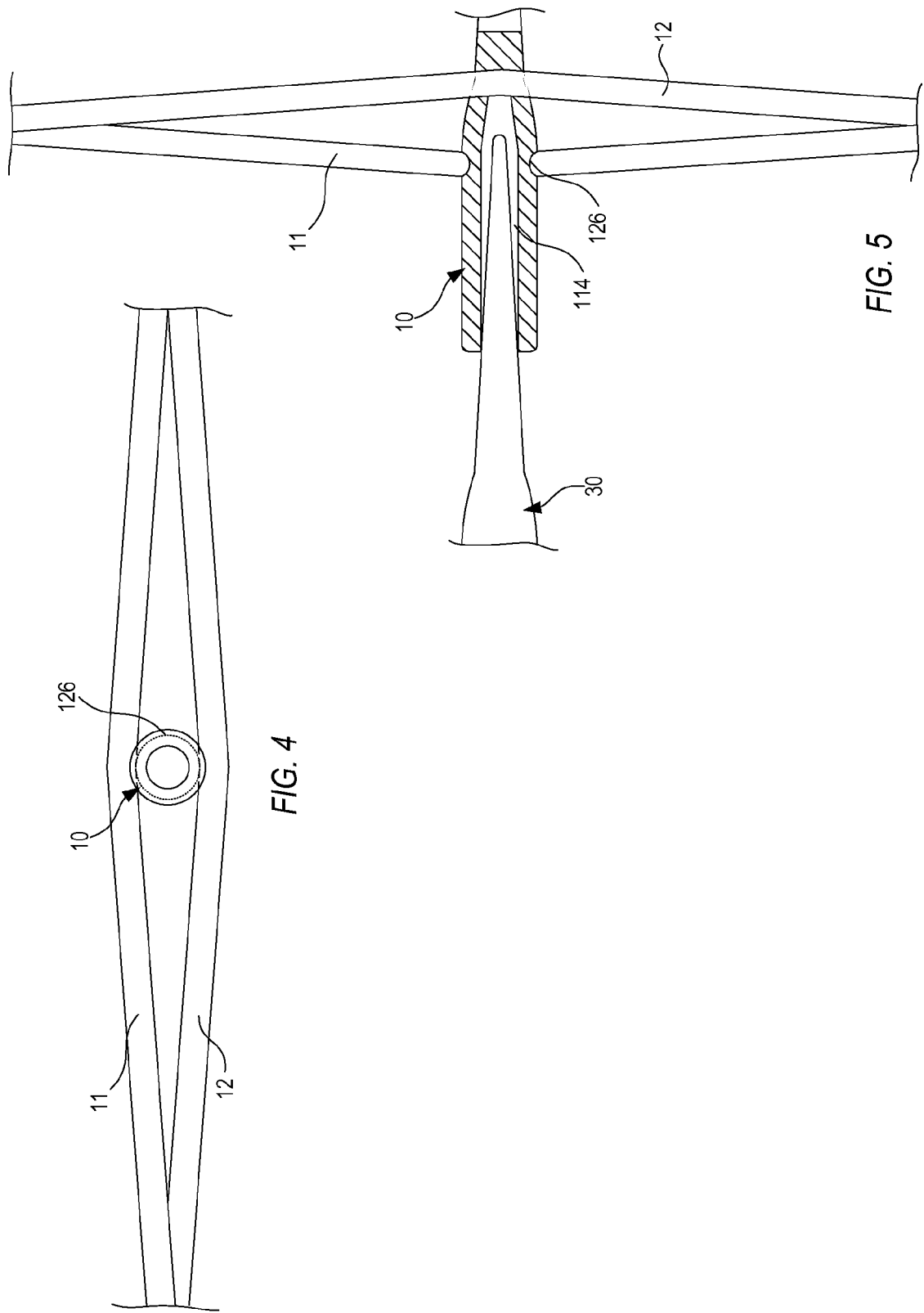

MULTI-FUNCTION HIGH VOLTAGE WIRE SERVICE HANDTOOL

CROSS REFERENCE TO RELATED APPLICATIONS

The present application claims the benefit of priority under 35 USC 119(e) to U.S. Provisional Patent Application Ser. No. 61/704,895, filed Sep. 24, 2012, and entitled, "MULTI-FUNCTION HIGH VOLTAGE WIRE SERVICE HAND-TOOL," the entire specification of which is incorporated herein by reference in its entirety.

TECHNICAL FIELD

This document pertains generally to high-voltage wire-working, and more specifically to an implement for use as a high-voltage wire servicing hand tool.

BACKGROUND

In the distribution of electrical power, electrical lines, such as "triplexed secondaries" can be used to distribute electrical power to residential and commercial users. The triplexed secondary distribution line can be composed of two insulated electrical conductors wrapped helically around a third non-insulated conductor. The bare or non-insulated conductor "leg" is a neutral messenger or ground conductor while the two insulated conductors are typically energized and hence are known as "hot" legs.

Often, a single triplexed secondary distribution line is used to supply a number of different residential or commercial customers with electrical power. Hence, it is necessary to tap the triplexed secondary line at various points along its length so that electrical power can conveniently be provided to multiple users from the same triplexed secondary.

Tapping the triplexed secondary distribution line is accomplished by attaching an electrical connector known as a mid-span tap to the individual insulated conductors and a neutral connector which serves as a separator and dead-end for service drop cables. The construction of the mid-span and neutral connectors are such that when the conductors of the triplexed secondary are connected, the individual conductors in the vicinity of the connections are spaced from each other. This is in contrast to the normal situation in which the conductors are twisted and hence contact each other. Once the connector taps have been secured to the conductors of the triplexed secondary, triplexed service drop connectors from the individual residential or commercial customers are connected to the tap to distribute power to such customers.

In the course of connecting a mid-span tap to a triplexed secondary distribution line, it is necessary to spread the conductors, particularly the hot legs, and once they are spread maintain them in a spread condition while the mid-span tap and neutral connectors are being connected. Of course, after the mid-span tap connection is completed, the conductors of the triplexed secondary remain spread in the region of the taps by virtue of the construction of the connectors themselves.

To facilitate spreading the conductor of a triplexed secondary while a mid-span tap is being connected, a variety of spreading tools have been proposed. A simply approach is to use a screw driver. This approach, however, presents a safety risk in that the instrument can conduct electricity to the hand of the user if the conductive pathway is not fully insulated. Other spreaders have been proposed. For various reasons, such as expense, difficulty of use and mechanical stability, the proposals heretofore made have not been entirely satisfactory. For example, U.S. Pat. Nos. 3,352,301 and 3,734,462 disclose spreaders in the form of large screws which are threaded between two conductors to be spread. Once the device has been threaded between a pair of conductors it maintains the conductors in a spread condition without further manual intervention. The disadvantage of this approach, however, is the bulkiness and cost of the tool itself, and the fact that it takes longer to actually spread the conductor with the tool than other approaches. In addition, the device is incapable of spreading three conductors simultaneously; if three conductors are to be spaced, two devices are necessary.

Another approach is found in the tool disclosed in U.S. Pat. No. 2,841,364. In accordance with this tool, a pair of spaced angulated studs are provided in the central portion of a long bar. The studs are inserted between the conductors to be spread and the handle gripped at its opposite ends and rotated 90°, spreading the conductors. The problem with this tool is that both hands of the user must engage the tool to spread the conductors. A further disadvantage is that once the conductors are spread the tool is mechanically unstable in the sense that if it is accidentally bumped, the tension of the spread conductors can snap the tool back to its initial position with the conductors contacting each other.

Other schemes have been proposed, such as described in U.S. Pat. Nos. 3,174,723, 3,269,706 and 3,425,114, operating on a "scissors-like" principle. However, each requires two hands to operate and due to the number and complexity of moving parts, is relatively expensive. U.S. Pat. No. 3,918,684 presents a hand tool to spread apart wires and maintain them spread apart, however the tool is bulky and is limited in use. Various other approaches have been used, each of which have one or more disadvantages with respect to cost, ease of use and/or mechanical stability.

A shortcoming of the prior art approaches is that they are not multi-use. A lineman can only take so many tools up with them as they service wires, and making a special trip just to spread wires adds time and therefore cost to maintenance operations. What is needed is a wire spreader that can solve a number of problems lineman face.

SUMMARY

Accordingly, it has been an objective of this subject matter to provide an inexpensive conductor spreading tool which can be used with one hand and which, once the conductors have been spread, is mechanically stable such that if accidentally bumped it will not revert to its initial position, placing the conductors in contact. This objective has been accomplished in accordance with certain of the principles of the subject matter by providing a tool that includes a generally straight elongate bar extending from a proximal portion including a back end to a distal portion including a tip that is generally smaller in diameter than the proximal portion, the proximal portion including a hand-graspable handle, the bar defining a hollow extending into the handle, the hollow extending from an interior wall of the hollow to an opening in the handle, the bar including a shoulder encircling the bar defining a transition between an at least partially conical shape extending from the tip to the shoulder and a spreader portion extending from the shoulder to the handle, wherein the hollow is sized to receive the transmission cable, with the opening being larger in diameter than both the conductor of the transmission cable and an insulator of the transmission cable.

The tool of this subject matter is inexpensive to manufacture. It is also easy to use in that it can be operated to spread a cabled construction with only one hand of the lineman. It can be used to spread apart cables such as those in a triplexed construction, although other constructions can also be repaired. It is mechanically stable and can withstand being bumped. It can be used to cover bare wire ends. The tool 10 can be removed and reinserted in different positions to isolate conductors for repair of multiple insulation or conductor of a bundle. It can be combined in can be inserted into another tool to provide leverage in spinning that tool. It can provide electrical insulation against shock. It can remove staples. It can provide an anchor point for a rope used to scale a pole. It can provide a stop to hold a wire out of place while repairing other wires, such as by inserting the tool into a cross-bar of a telephone pole and pulling a wire out of its resting place and hooking it on the tool.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1A is a perspective view of a hand tool, according to an example.

FIG. 1B is a view along an opposite perspective of the view of FIG. 1A.

FIG. 1C is a front view of the tool of FIG. 1A.

FIG. 1D is a cross-sectional view taken along line 1D-1D in FIG. 1C and 1E.

FIG. 1E is a view taken along line 1E-1E in FIG. 1C.

FIG. 3 illustrates a tool used as a rope hanger and as a barrier to maintain a cable out of position, according to an example.

FIG. 4 illustrates a tool separating two conductors, according to an example.

FIG. 5 illustrates a tool separating two conductors, according to an example.

DETAILED DESCRIPTION

Figure 1F:
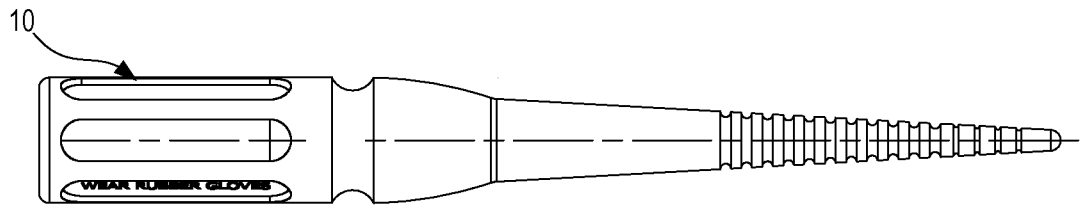
FIG. 1F is a rotated front view of the tool of FIG. 1A.
Figure 1G:
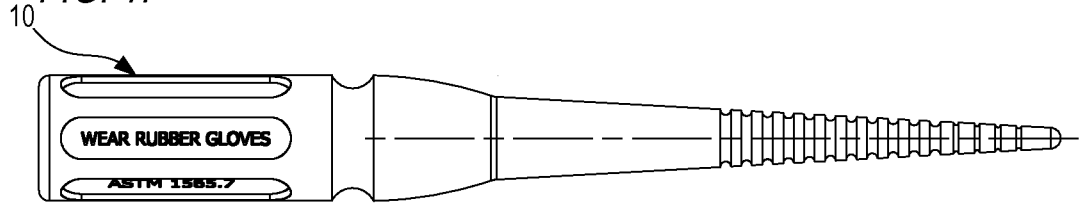
FIG. 1G is a rotated front view of the tool of FIG. 1A.
Figure 1H:
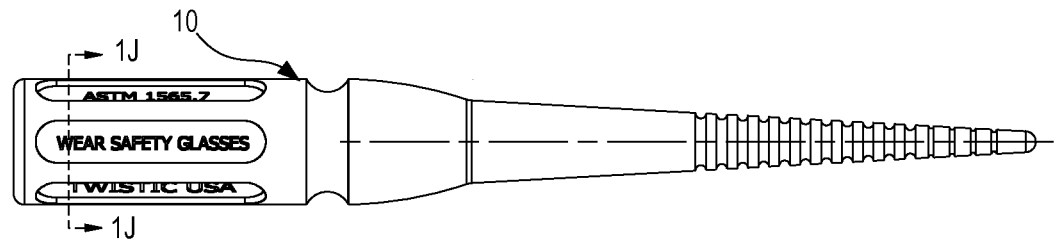
FIG. 1H is a rotated front view of the tool of FIG. 1A.
Figure 1I:
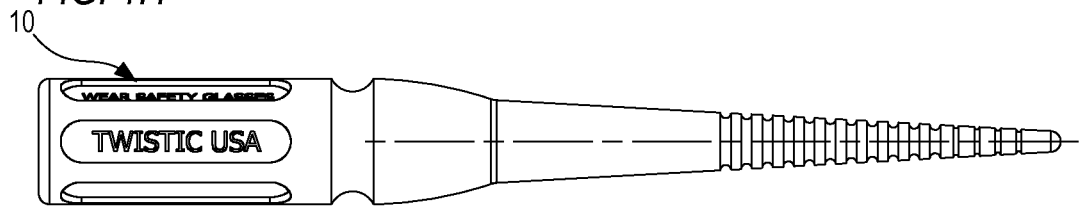
FIG. 1I is a rotated front view of the tool of FIG. 1A.
Figure 1J:
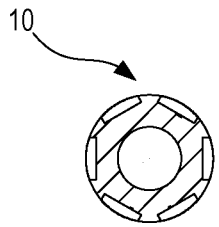
FIG. 1J is a cross-sectional view taken along line 1J-1J in FIG. 1H.
Figure 1K:
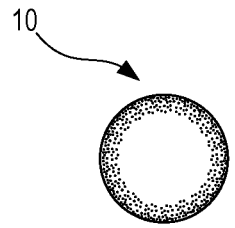
FIG. 1K is a left view of the tool of FIG. 1A.

With reference to FIG. 1A through FIG. 5, among several uses, the tool 10 of this subject matter is designed for spreading a pair of conductors, such as conductors 11 and 12 illustrated in FIGS. 4 and 5, which may be twisted along their length with respect to each other. Conductors 11 and 12 can be insulated electrical conductors to which a voltage is applied, commonly known as the "hot legs" of a triplex secondary distribution line. The tool 10 is useful for repairing different bundles including, but not limited to, duplex, triplex, quadraplex, etc. and even single wires. The tool 10 can be used to spread the insulated conductors 11 and 12 so that an electrical connector assembly, such as a mid-span tap, can be conveniently secured to the conductors.

The tool can be used to install insulated standoffs, layout arms, wire support arms, gin poles and the like. It can be used to pry wires or components and remove or install ground jumpers and hotcaps. One advantage can be that an insulated tool used in close proximity to multiple out-of-phase phases of a wire bundle, bridging them, without shorting them. Another advantage is that it can be used to assist in the installation of staples, such as in close clearance situations, and in situations where the lineman's dexterity is limited due to cold.

Referring to FIGS. 1A-K, the tool 10 can generally have a straight elongate shape extending from a proximal portion 104 including a back end 106 to a distal portion 108 including a tip 110. The tip 110 can be generally smaller in diameter than the proximal portion 104. The distal portion 108 can taper to being wider away from the tip 110. The distal portion 108 can be generally conical in shape. The distal portion 108 can have a generally frustoconical shape. The distal portion 108 can have a generally circular cross-section, although n-gonal shapes with 2 (e.g., a blade) or more sides are possible.

The tool 10 can include a shoulder or spreader portion 122 encircling the bar. The spreader portion 122 can define a transition in diametrical size of the bar between a first diameter 124 in the distal portion 108 and a second diameter 120. The second diameter 120 can be wider than the first diameter 124. The spreader portion 122 can spread apart wires, such as the wires 11-12 illustrated in FIGS. 4-5.

The spreader portion 122 can have a generally frustoconical shape. The spreader portion can have a generally circular cross-section, although n-gonal shapes with 2 (e.g., a blade) or more sides are possible. The exterior of the spreader portion can be convex.

The distal portion 108 can include a mammillated portion 130. The mammillated portion 130 can include a first portion 132 defining a first plurality of grooves each spaced apart from one another at a first distance D11, and a second portion 134 defining a second plurality of grooves each spaced apart from one another at a second distance D12 other than the first distance D11. The mammillated portion is helpful for removal of staples, such as by inserting the tool under a staple and hooking the staple to the mammillated portion to remove the staple. Additionally, the mammillated portion 130 can be used to hold a staple in place so that the staple can be pounded into another material. The nonconductive nature of the tool, described in further detail below, reduces instances of electrical conductivity should a staple strike a conductor. The grooves having different diameters contributes to compatibility with different staple sizes and shapes.

A channel 126 can encircle the proximal portion, the channel 126 disposed between the handle 112 and the distal portion 108. The channel 126 can have an arcuate cross-section, as illustrated in FIG. 1D. The channel 126 can be disposed between the spreader portion 122 and the handle 112. The hollow 114 can define internal threads 127, which can be used such as to thread onto a conductor or another tool as discussed herein.

One of the benefits of the channel 126 is that the lineman using the tool 10 can work with both hands to secure a suitable mid-span tap or connector to the conductors 11-12 without further attention to, or need for, manipulating the tool 10. This can be because the tension of the conductors 11-12 being disposed in the channel 126 tends to keeps the tool 10 in alignment with respect to the conductors 11-12.

The proximal portion 104 can include a hand-graspable handle 112. As illustrated in FIG. 1D, the tool 10 can define a hollow 114 extending into the handle 112. The hollow 114 can extend from an inner portion 116 to an opening 118 in the handle 112. The inner portion 116 can be opposite the opening. The inner portion 116 can be planar and define a face, but the present subject matter is not so limited.

The handle 112 can include a plurality of finger lands 136. The finger lands 136 can be defined by flutes. The finger lands can be sized to receive one or more finger tips.

The tool 10 can be formed of an electrically insulative dielectric. Possible materials from which the tool 10 can be constructed are nonconductive and include, but are not limited to, plastics, wood, ceramic or the like. The tool 10 can be formed of nylon with chopped fiber disposed therein comprising a composite. Forming the tool 10 out of nonconductive material can reduce electrical shock hazards should one or more of the conductors 11-12 be energized. The tool decreases instances of unwanted arc should the tool bridge two conductors of different polarity. The tool provides added safety by reducing instances of unwanted conductivity to a lineman should other protection fail, such as insulative gloves or some other insulation. Lineman often work in harsh conditions, such as low-light condition as low temperature, and cannot always inspect gloves or other safety equipment to ensure proper function. Accordingly, the insulative nature of the tool 10 provides added safety. Rounding edges of the tool 10 can additionally reduce instances of glove puncture. Of course, this is not essential if the conductors 11-12 are not energized when worked upon, or other actions are taken to reduce or avoid electric shock.

The tool can be around twelve inches long and 1.5 inches in diameter. While the present subject matter has been described in connection with reference to specific dimensions for certain elements of the tool, it is understood that these are only illustrative and that the various parts of the tool can be sized according to considerations of strength, convenience, etc.

Figure 2:
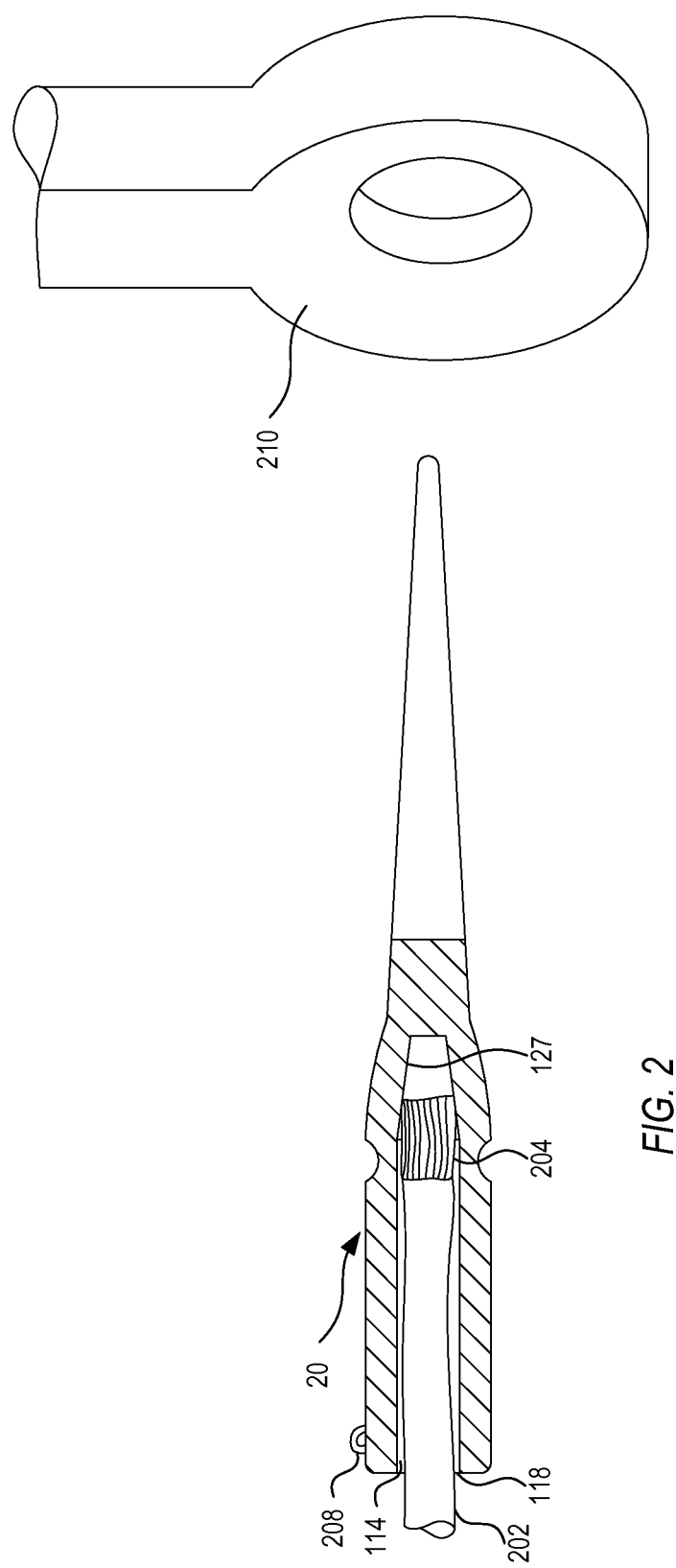
FIG. 2 illustrates a cross-section view of a tool, showing the tool with a wire disposed therein, to be inserted into an orifice, according to an example.

FIG. 2 illustrates a cross-section view of a tool 20, showing the tool with a wire disposed therein, to be inserted into an orifice, according to an example. As illustrated, a hollow 114 can be sized to receive a transmission cable 202. An opening 118 can be larger in diameter than one or both the conductor 204 of the transmission cable 202 and an insulator of the transmission cable.

The hollow 114 can include a threaded portion 127. The threaded portion can serve as a wire-nut to be connected to the cable 202, such as by screwing around the exposed conductor 204. The threaded portion 127 can be formed of material of a different hardness than other portions of the tool 20, and need not necessarily be dielectric.

The illustration shows an eyelet 210 into which the tool 20 can be inserted. The eyelet 210 can form another part of a lineman's toolbox, such as an adjustment portion of a gripstick type tool for coupling to a hot wire. The nonconductive nature of the tool 20 can insure that little or no electricity is conducted from the eyelet 210 in use. It should be noted that the tool 20 need not necessarily have the cable 202 disposed therein in use.

The illustration shows an optional lanyard eyelet 208 that can be coupled to a tool. The eyelet can be used to decrease the chances of a tool falling away from a lineman while they are working at the top of a utility pole.

FIG. 3 illustrates a tool used as a rope hanger and as a barrier to maintain a cable out of position, according to an example. On the left of the illustration, a rope 302 is shown draped around a tool 10. The tool can be inserted in a hole in a cross-member 304 and can serve as a hanger for a rope or for whatever the lineman might need.

On the right of the illustration, a cable 306, which can comprise one or more conductors, can be displaced out of position, and hooked on the tool 10. Such displacement can assist a lineman with repairing other portions of a line without being unnecessarily close to the cable 306, decreasing instances of accidentally touching the cable 306.

FIG. 4 illustrates a tool separating two conductors, according to an example. Conductors 11 and 12 are spread apart, and at least one of them are disposed in the channel 126, however both may be. FIG. 5 illustrates a tool separating two conductors, according to an example. In the illustration, a second tool 30 has been inserted into the hollow 114 to be used for leverage. The tool 30 can tapers from the back end to the tip. If a tool 10 is inserted into the hollow 114, a mammillated portion of the tool can interlace, at least partially, with threads 126 of the tool to decrease instances of slippage of the second tool out of the first.

The tools 10, 20, 30 can be made out of lightweight materials, such as dielectric composites of high strength. Several can be carried up a pole with a lineman to be used in servicing a utility pole without unnecessarily occupying room on the maintenance belt, and even replacing several tools in some instances.

Figure 6:
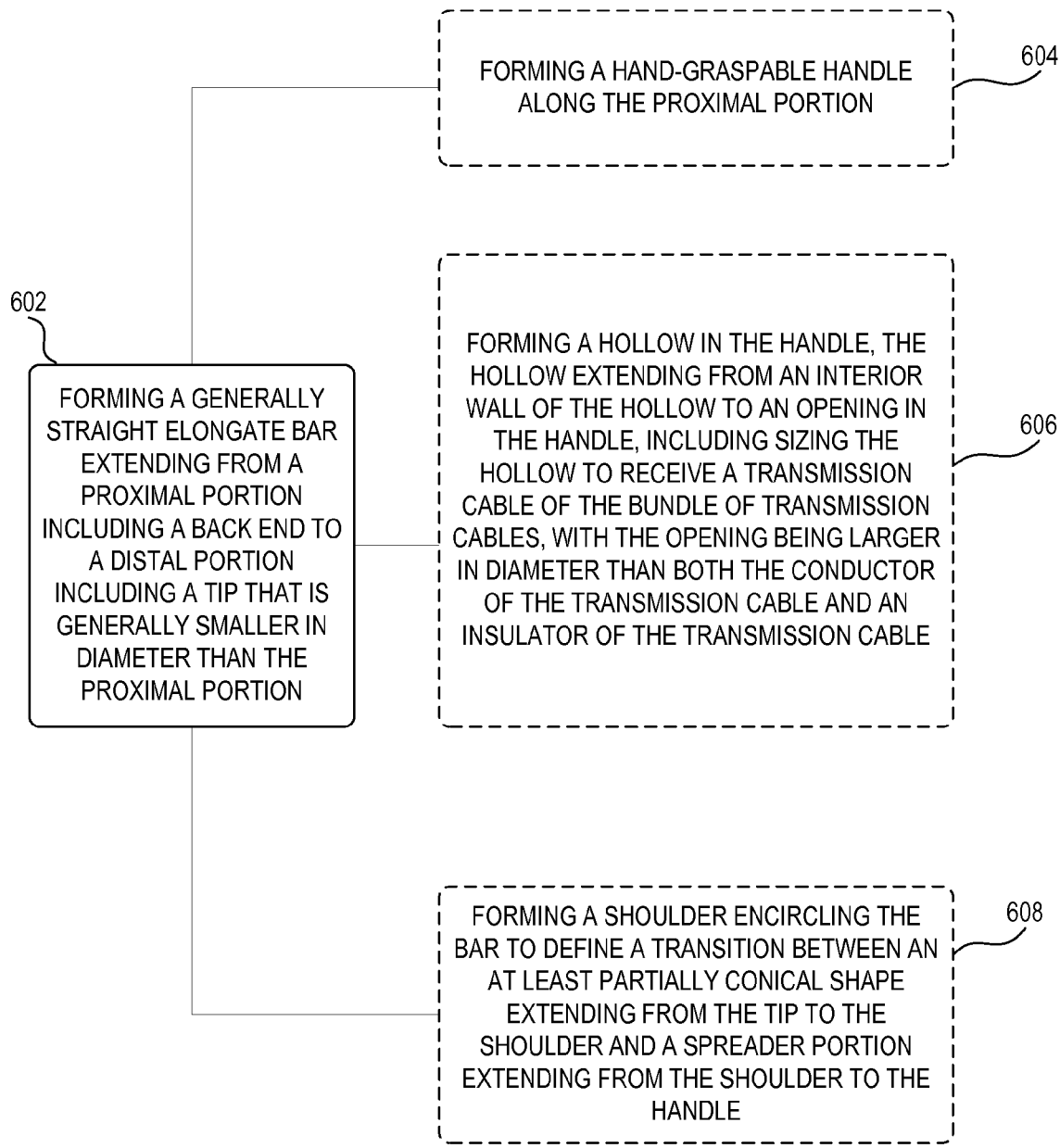
FIG. 6 illustrates a method of making a tool, according to an example.

FIG. 6 illustrates a method of making a tool, according to an example. The example can concern making a hand tool for repairing a bundle of transmission cables. At 602, the example can include forming a generally straight elongate bar extending from a proximal portion including a back end to a distal portion including a tip that is generally smaller in diameter than the proximal portion. At 604, the example can include forming can include forming a hand-graspable handle along the proximal portion. At 606, the example can include forming can include forming a hollow in the handle. The hollow can extend from an interior wall of the hollow to an opening in the handle, including sizing the hollow to receive a transmission cable of the bundle of transmission cables. The opening can be larger in diameter than one or both the conductor of the transmission cable and an insulator of the transmission cable. At 608, the example can include forming can include forming a shoulder encircling the bar. The shoulder can define a transition between an at least partially conical shape extending from the tip to the shoulder and a spreader portion extending from the shoulder to the handle.

Optional examples can include forming the hand-graspable handle can include forming flutes sized to receive one or more fingertips. Some examples can include forming indicia in the flutes, the indicia including safety instructions.

Figure 7:
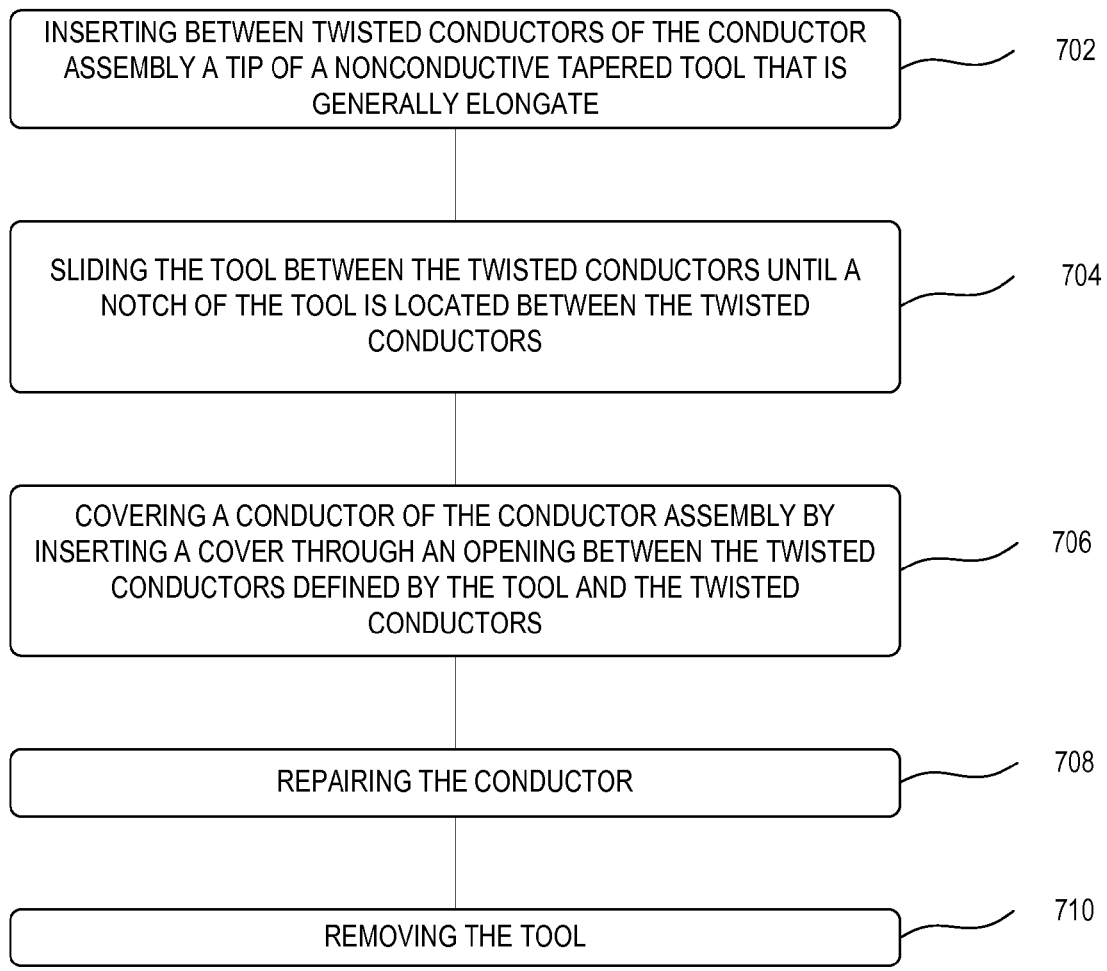
FIG. 7 illustrates a method of using a tool, according to an example.

FIG. 7 illustrates a method of using a tool, according to an example. The example can include spreading a conductor assembly and maintaining it in a spread condition. At 702, the example can include inserting between twisted conductors of the conductor assembly a tip of a nonconductive tapered tool that is generally elongate. At 704, the example can include sliding the tool between the twisted conductors until a notch of the tool is located between the twisted conductors. At 706, the example can include covering a conductor of the conductor assembly by inserting a cover through an opening between the twisted conductors defined by the tool and the twisted conductors. At 708, the example can include repairing the conductor. At 710, the example can include removing the tool.

The tool can be a first tool, and certain examples can further include inserting a tip of a second nonconductive tapered tool into a hollow portion of a handle of the first tool and rotating the conductor assembly by leveraging a handle of the second nonconductive tapered tool.

Figure 8A:
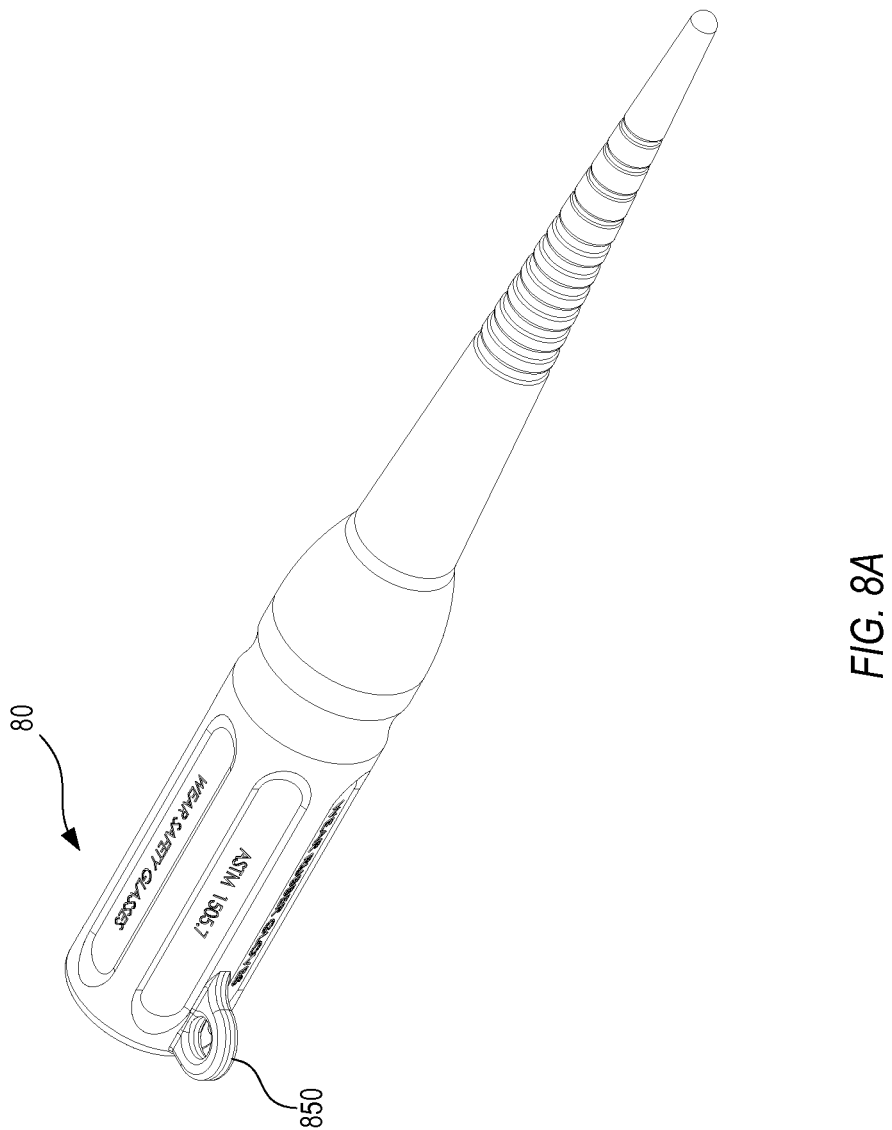
FIG. 8A is an elevated right side perspective view of a tool, according to an example.
Figure 8B:
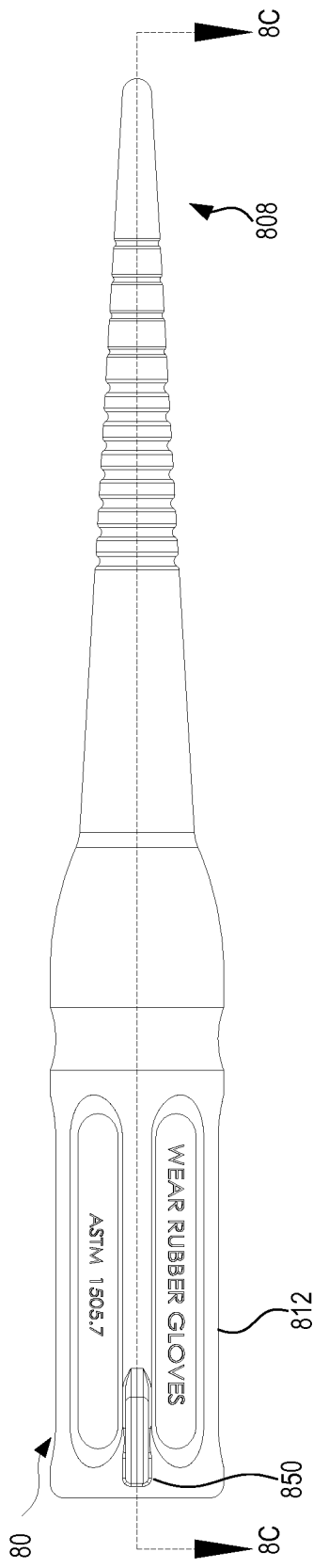
FIG. 8B is a front view of the tool of FIG. 8A.
Figure 8C:
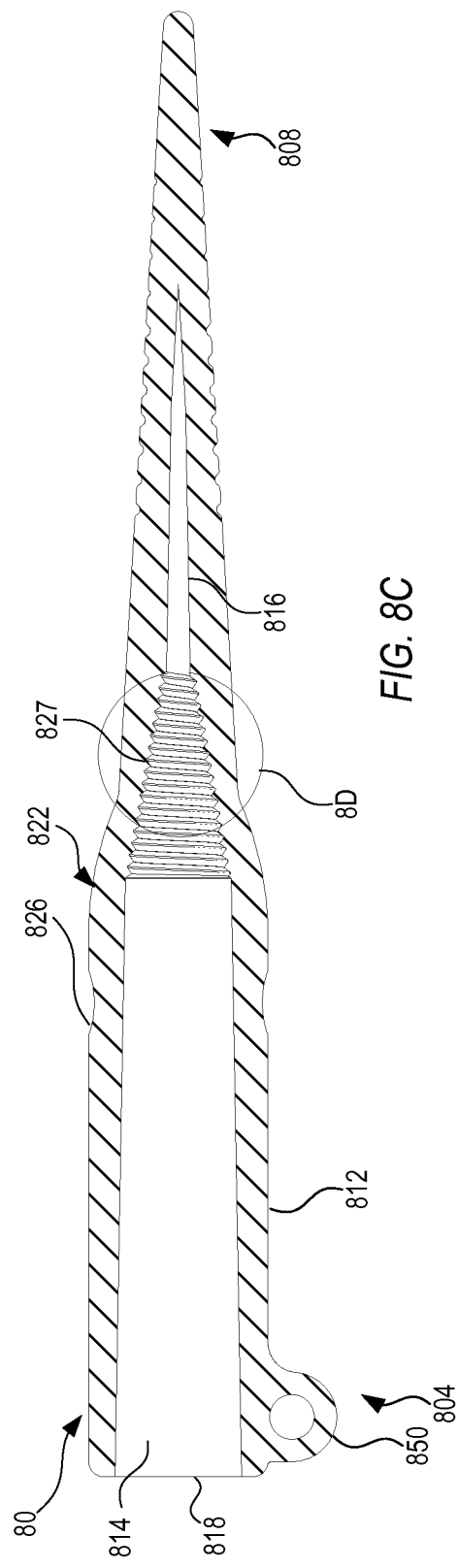
FIG. 8C is a cross-section taken along line 8C-8C in FIG. 8B.
Figure 8D:
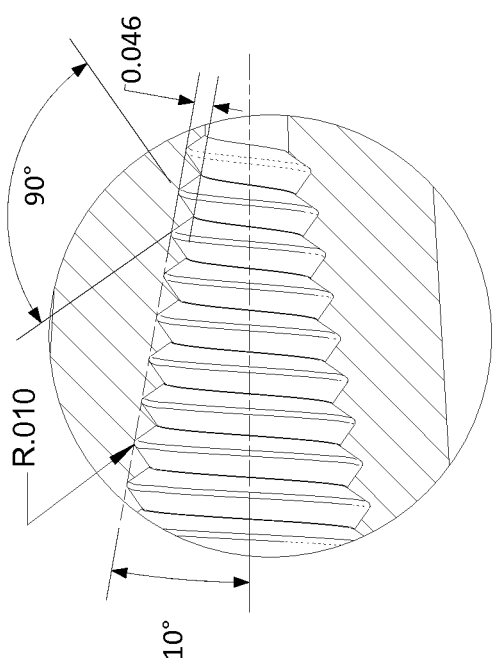
FIG. 8D is a close-up view of section 8D in FIG. 8C.

FIG. 8A is an elevated right side perspective view of a tool, according to an example. FIG. 8B is a front view of the tool of FIG. 8A. FIG. 8C is a cross-section taken along line 8C-8C in FIG. 8B. FIG. 8D is a close-up view of section 8D in FIG. 8C, illustrating inch dimensions that can be used. This tool 80 includes an optional lanyard eyelet 850. As pictured in FIG. 8C, a channel 826 can encircle the proximal portion 804. The channel 826 can be disposed between the handle 812 and the distal portion 808. The channel 826 can have an arcuate cross-section, as illustrated in FIG. 8D. The channel can be shallower than the channel 126 illustrated in FIG. 1A, for example having a sector spanning around 41 degrees of a circle.

The tool 80 can define a hollow 814 extending into the handle 812. The hollow 814 can extend from an inner spear-shaped void 816 to an opening 818 in the handle 812. The hollow can taper to being more narrow as it extends from the opening 818 toward the distal portion 808. The inner spear-shaped void 816 can be opposite the opening 818 and can extend into the distal portion 808 of the tool 80 toward the tip 810. The hollow 814 can define internal threads 827, which can be used such as to thread onto a conductor or another tool as discussed herein. The threads 827 can be disposed between the spear-shaped void 816 and the opening 818.

Figure 8E:
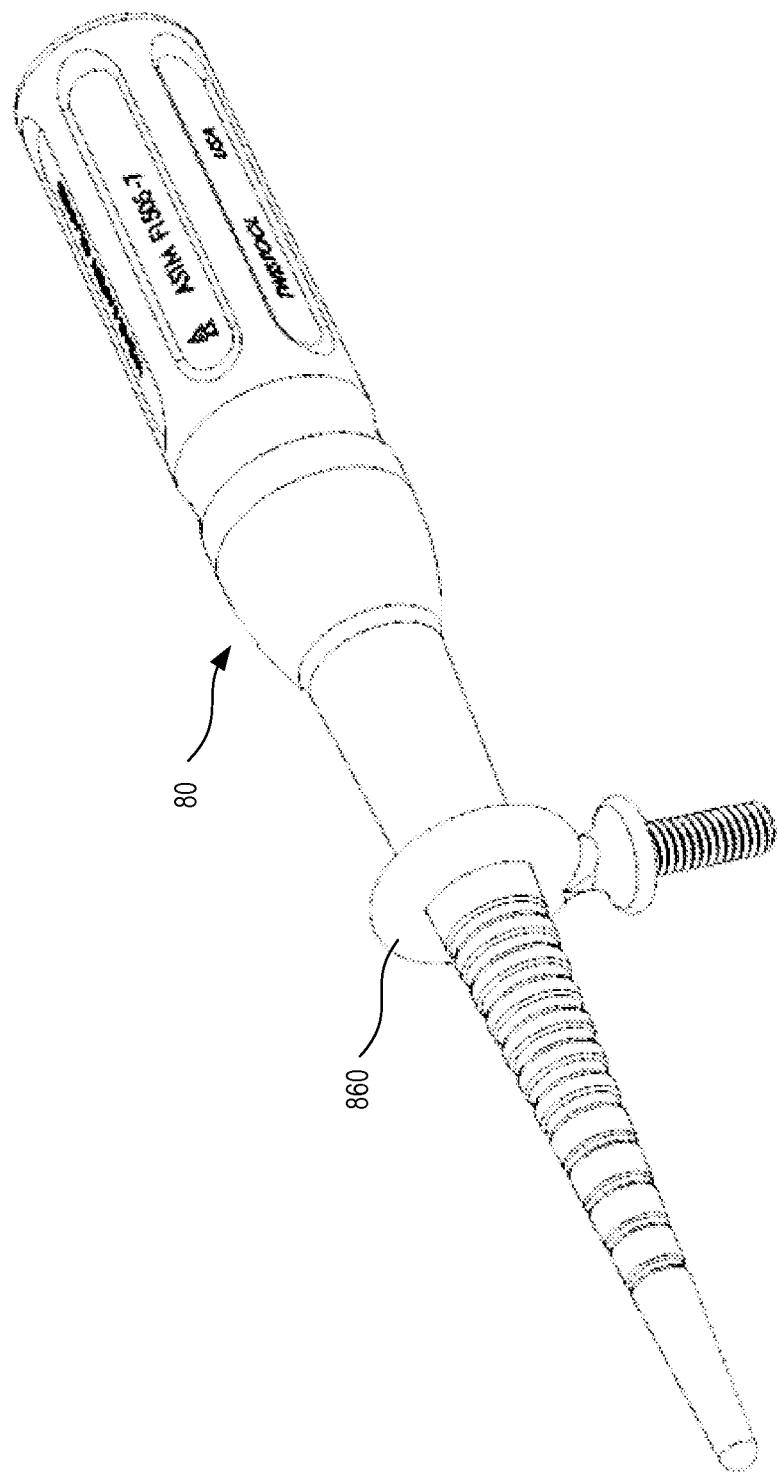
FIG. 8E is an elevated perspective view of the tool of FIG. 8A manipulating an eyelet, according to an example.

FIG. 8E illustrates the tool 80 inserted into an eyelet 860. The eyelet 860 can form another part of a lineman's toolbox, such as an adjustment portion of a grip-stick type tool for coupling to a hot wire. The nonconductive nature of the tool 80 can insure that little or no electricity is conducted from the eyelet 810 in use.

EXAMPLES AND NOTES

The present subject matter may be described by way of several examples. Example 1 can include subject matter (such as an system, apparatus, method, tangible machine readable medium, etc.) that can include a hand tool for repairing high-voltage electric power transmission cable. The tool can include a generally straight elongate bar extending from a proximal portion including a back end to a distal portion including a tip. The tip can be generally smaller in diameter than the proximal portion, the proximal portion including a hand-graspable handle. The bar can define a hollow extending into the handle. The hollow can extend from an inner portion to an opening in the handle. The inner portion can be opposite the opening. The hollow can be sized to receive a transmission cable. The opening can be larger in diameter than one or both the conductor of the transmission cable and an insulator of the transmission cable. The bar can include a shoulder encircling the bar. The shoulder can define a transition in diametrical size of the bar between a first diameter in the distal portion and a second diameter. The second diameter can be wider than the first diameter. The shoulder can be part of a spreader portion of the bar to spread apart wires of a bundle of high-voltage wires.

Example 2 can include the structure of example 1, where the hollow is at least partially internally threaded.

Example 3 can include any of the preceding examples, in which the hollow terminates in a threaded portion.

Example 4 can include any of the preceding examples and can include a hollow that extends into a spear-shaped void extending between the threads and the tip.

Example 5 can include any of the preceding examples, wherein the distal portion tapers wider away from the tip and is generally conical in shape.

Example 6 can include any of the preceding examples, wherein a channel encircles the proximal portion, the channel disposed between the handle and the distal portion.

Example 7 can include any of the preceding examples, wherein the channel has an arcuate cross-section.

Example 8 can include any of the preceding examples, wherein the channel is dispose between the spreader portion and the handle.

Example 9 can include any of the preceding examples, wherein the distal portion includes a mammillated portion.

Example 10 can include any of the preceding examples, wherein the mammillated portion includes a first portion defining a first plurality of grooves each spaced apart from one another at a first distance, and a second portion defining a second plurality of grooves each spaced apart from one another at a second distance other than the first distance.

Example 11 can include any of the preceding examples, wherein the spreader portion having a generally frustoconical shape in cross-section.

Example 12 can include any of the preceding examples, wherein the exterior of the spreader portion are convex.

Example 13 can include any of the preceding examples, comprising a lanyard eyelet attached to the tool.

Example 14 can include any of the preceding examples, wherein the handle includes a plurality of finger lands defined by flutes sized to receive finger tips.

Example 15 can include any of the preceding examples, wherein the tool is formed of an electrically insulative dielectric.

Example 16 can include any of the preceding examples, wherein the tool tapers from the handle to the tip.

Example 17 can include any of the preceding examples, wherein the tool tapers from the back end to the tip.

Example 18 can include subject matter (such as an system, apparatus, method, tangible machine readable medium, etc.) that can include making the hand tool of any of the preceding claims. The example can include making a hand tool for repairing a bundle of transmission cables. The example can include molding a generally straight elongate bar extending from a proximal portion including a back end to a distal portion including a tip that is generally smaller in diameter than the proximal portion. Molding can include forming a hand-graspable handle along the proximal portion. Forming can include forming a hollow in the handle. The hollow can extend from an interior wall of the hollow to an opening in the handle, including sizing the hollow to receive a transmission cable of the bundle of transmission cables. The opening can be larger in diameter than one or both the conductor of the transmission cable and an insulator of the transmission cable. Forming can include forming a shoulder encircling the bar. The shoulder can define a transition between an at least partially conical shape extending from the tip to the shoulder and a spreader portion extending from the shoulder to the handle.

Example 19 can include any of the preceding examples, wherein forming the hollow includes forming threads in the hollow.

Example 20 can include any of the preceding examples, wherein forming the hand-graspable handle includes forming flutes sized to receive one or more fingertips.

Example 21 can include any of the preceding examples, comprising forming indicia in the flutes, the indicia including safety instructions.

Example 22 can include subject matter (such as an system, apparatus, method, tangible machine readable medium, etc.) that can include using any of the preceding examples. The example can include spreading a conductor assembly and maintaining it in a spread condition. The example can include inserting between twisted conductors of the conductor assembly a tip of a nonconductive tapered tool that is generally elongate. The example can include sliding the tool between the twisted conductors until a notch of the tool is located between the twisted conductors. The example can include covering a conductor of the conductor assembly by inserting a cover through an opening between the twisted conductors defined by the tool and the twisted conductors. The example can include repairing the conductor. The example can include removing the tool.

Example 23 can include any of the preceding examples, wherein the tool is a first tool, and further comprising inserting a tip of a second nonconductive tapered tool into a hollow portion of a handle of the first tool and rotating the conductor assembly by leveraging a handle of the second nonconductive tapered tool.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with patent rules, to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A hand tool for repairing high-voltage electric power transmission cable, the tool comprising:
   a generally straight elongate bar extending from a proximal portion including a back end to a distal portion that includes a tip that is generally smaller in diameter than the proximal portion,
   the proximal portion including a hand-graspable handle,
   the bar defining a hollow extending into the handle, the hollow extending from an inner portion to an opening in the handle, the inner portion being opposite the opening, wherein the hollow includes tapered internal threads, and is sized to receive the transmission cable, with the opening being larger in diameter than both the conductor of the transmission cable and an insulator of the transmission cable,
   the bar including a shoulder encircling the bar defining a transition in diametrical size of the bar between a first diameter in the distal portion and a second diameter that is wider than the first diameter, the shoulder being part of a spreader portion of the bar to spread apart wires of a bundle of high-voltage wires.

2. The tool of claim 1, wherein a channel encircles the proximal portion, the channel disposed between the handle and the distal portion.

3. The tool of claim 2, wherein the channel has an arcuate cross-section.

4. The tool of claim 2, wherein the channel is disposed between the spreader portion and the handle.

5. The tool of claim 1, wherein the distal portion includes a mammillated portion.

6. The tool of claim 5, wherein the mammillated portion includes a first portion defining a first plurality of grooves each spaced apart from one another at a first distance, and a second portion defining a second plurality of grooves each spaced apart from one another at a second distance other than the first distance.

7. The tool of claim 1, wherein the spreader portion has a generally frustoconical shape in cross-section.

8. The tool of claim 7, wherein the exterior of the spreader portion is convex.

9. The tool of claim 1, comprising a lanyard eyelet attached to the tool.

10. The tool of claim 1, wherein the handle includes a plurality of finger lands defined by flutes sized to receive finger tips.

11. The tool of claim 1, wherein the tool is formed of an electrically insulative dielectric.

12. The tool of claim 1, wherein the tool tapers from the handle to the tip.

13. The tool of claim 12, wherein the tool tapers from the back end to the tip.

14. A method of making a hand tool for repairing a bundle of transmission cables, comprising:
forming a generally straight elongate bar extending from a proximal portion including a back end to a distal portion including a tip that is generally smaller in diameter than the proximal portion, the forming comprising:
forming a hand-graspable handle along the proximal portion;
forming a hollow in the handle with tapered internal threads, the hollow extending from an interior wall of the hollow to an opening in the handle, including sizing the hollow to receive a transmission cable of the bundle of transmission cables, with the opening being larger in diameter than both the conductor of the transmission cable and an insulator of the transmission cable, and
forming a shoulder encircling the bar to define a transition between an at least partially conical shape extending from the tip to the shoulder and a spreader portion extending from the shoulder to the handle.

15. A method of spreading a conductor assembly and maintaining it in a spread condition comprising the steps of:
providing a nonconductive tool comprising a generally straight elongate bar extending from a proximal portion including a back end to a distal portion that includes a tip that is generally smaller in diameter than the proximal portion, the proximal portion including a hand-graspable handle, the bar defining a hollow extending into the handle, the hollow extending from an inner portion to an opening in the handle, the inner portion being opposite the opening, wherein the hollow includes tapered internal threads, and is sized to receive the transmission cable, with the opening being larger in diameter than both the conductor of the transmission cable and an insulator of the transmission cable, the bar including a shoulder encircling the bar defining a transition in diametrical size of the bar between a first diameter in the distal portion and a second diameter that is wider than the first diameter, the shoulder being part of a spreader portion of the bar to spread apart wires of a bundle of high-voltage wires;
inserting between twisted conductors of the conductor assembly the tip of the tool;
sliding the tool between the twisted conductors until a notch of the tool is located between the twisted conductors; and
covering a conductor of the conductor assembly by inserting a cover through an opening between the twisted conductors defined by the tool and the twisted conductors;
repairing the conductor; and
removing the tool.

16. The method of claim 15, further comprising inserting a tip of a second nonconductive tapered tool into a hollow portion of a handle of the first tool and rotating the conductor assembly by leveraging a handle of the second nonconductive tapered tool.

* * * * *